United States Patent [19]

Schatz

[11] 3,921,092

[45] Nov. 18, 1975

[54] RESONANT LOAD POWER SUPPLY WITH PHASE LOCKED LOOP

[75] Inventor: Douglas S. Schatz, Santa Clara, Calif.

[73] Assignee: Applied Materials, Inc., Santa Clara, Calif.

[22] Filed: May 22, 1974

[21] Appl. No.: 472,191

[52] U.S. Cl................. 331/1 R; 219/10.77; 331/17; 331/27

[51] Int. Cl.$^{2}$........................ H03B 3/04; H05B 5/06

[58] Field of Search........... 331/1 R, 17, 18, 25, 27; 219/10.75, 10.77

[56] References Cited

UNITED STATES PATENTS

| | | | |
|---|---|---|---|
| 3,816,690 | 6/1974 | Mittelmann | 219/10.77 |
| 3,826,993 | 7/1974 | White | 331/1 R |

*Primary Examiner*—Siegfried H. Grimm
*Attorney, Agent, or Firm*—Flehr, Hohbach, Test, Albritton & Herbert

[57] ABSTRACT

Power supply for delivering radio frequency power to a resonant load utilizing a phase locked loop to control the phase and frequency of the power delivered by the supply to the load.

7 Claims, 2 Drawing Figures

RESONANT LOAD POWER SUPPLY WITH PHASE LOCKED LOOP

BACKGROUND OF THE INVENTION

This invention pertains generally to power supplies and more particularly to a power supply for delivering radio frequency power to a resonant load.

Inductively heated vapor sources utilized in vapor deposition operations have a work coil located in close proximity to the load, through which current is passed, transferring energy to the load, thus inducing heat in the load to effect vaporization.

State of the art work coils typically require RMS operating currents as high as several hundred amperes at a frequency on the order of 50KHz. The power supplies which supply this current typically utilize high power switching transistors in their output stages. These transistors are costly, and they are easily damaged, particularly during the time they are turning on and off, which they each must do fifty thousand times per second for a 50KHz output.

It has been found that the possibility of damage to the switching transistors can be minimized by turning them on and off when the current through them is zero, and in the power supply of the invention this is accomplished by operating the supply in a resonant mode.

SUMMARY AND OBJECTS OF THE INVENTION

In the power supply of the invention, a capacitor is connected electrically in series with the work coil of a vapor source, and a phase-locked loop keeps the power supply operating at the resonant frequency of the coil and capacitor. Operation at resonance is detected by comparing the phases of the driving voltage and the voltage across the capacitor, the phases of these voltages being in quadrature at resonance. A voltage controlled oscillator is controlled by a signal corresponding to the deviation of the phases from quadrature.

It is in general an object of the invention to provide a new and improved power supply for supplying power to resonant loads.

Another object of the invention is to provide a power supply of the above character utilizing a phase-locked loop to maintain the frequency of the output power at the resonant frequency of the load.

Additional objects and features of the invention will be apparent from the following description in which the preferred embodiment is set forth in detail in conjunction with the accompanying drawings.

DESCRIPTION OF THE PREFERRED EMBODIMENT

Figure 1:
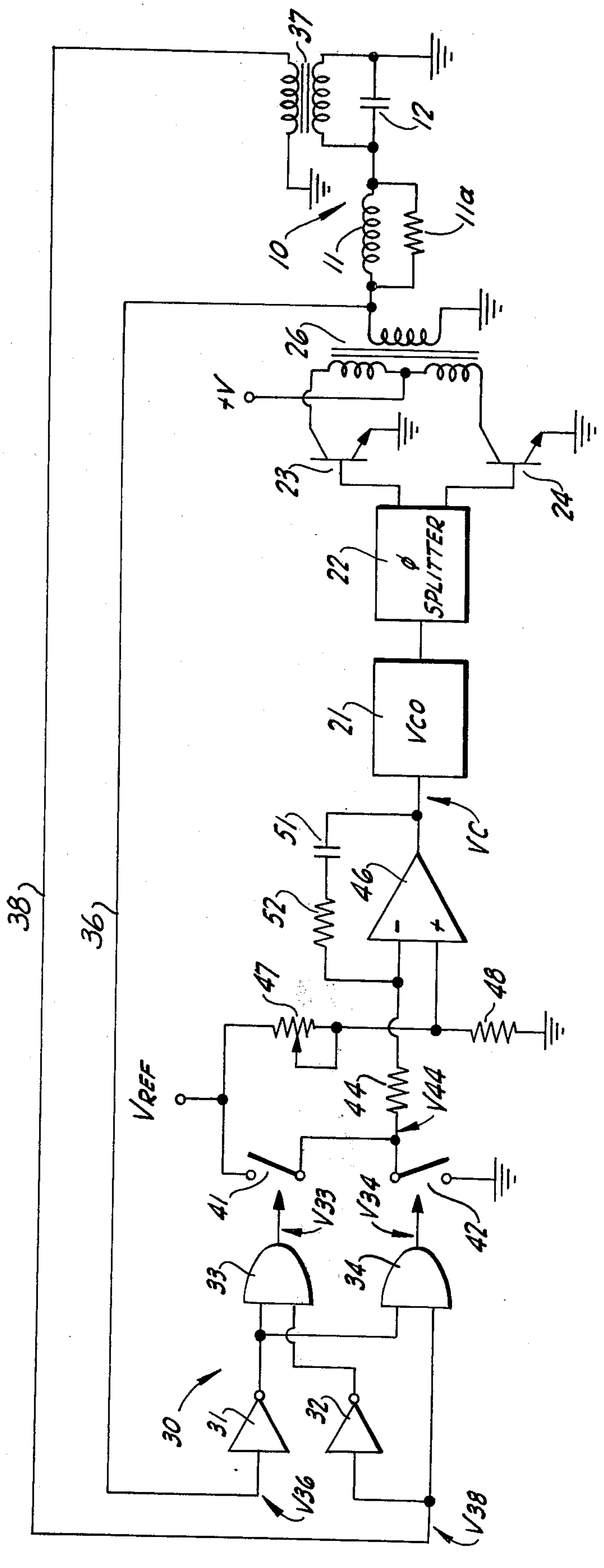
FIG. 1 is a circuit diagram, partially in block form, of a power supply according to the invention.

In FIG. 1, the power supply is illustrated in connection with a resonant load 10 comprising a coil 11 which can, for example, be the work coil of an induction heated vapor source located remotely of the power supply and connected thereto by a suitable transmission line. The work coil heats the material to be vaporized by inducing a current therein, and the impedance seen by the power supply changes somewhat as the state and amount of material changes. In the drawing, the changing impedance of the load is illustrated by a resistor 11a in parallel with coil 11. The load also includes a capacitor 12 connected electrically in series with the coil. The capacitor is preferably enclosed in a housing with the power supply, and the values of the coil and capacitor are chosen to make the load resonant at the desired operating frequency for the vapor source.

The power supply includes a voltage controlled oscillator 21 which produces an output signal having a frequency determined by a control signal. This oscillator is of conventional design, and it has an operating frequency range which includes the resonant frequency of the load.

Means is provided for delivering power to the load at the frequency determined by the oscillator and controlled by the resonant frequency of the load. This means includes a phase splitter 22 connected to the output of the oscillator. The phase splitter is of conventional design, the it produces two output signals having the same frequency as the oscillator signal and a phase difference of 180°. The outputs of the phase splitter are connected to the bases of transistors 23 and 24 in a push-pull output stage. The emitters of both transistors are grounded, and the collectors are connected to the primary winding of an output transformer 26. This winding is center-tapped and the center tap is connected to a source of voltage +V. The secondary winding of the output transformer is connected to load 10.

The power supply also includes a quadrature phase detector 30 which monitors the phases of the voltage delivered to load 10 and the voltage developed across capacitor 12. The phase detector comprises inverters 31, 32 and AND gates 33, 34, with the output of inverter 31 connected to one input of each of the AND gates. The input of inverter 32 is connected to the second input of AND gate 34, and the output of inverter 32 is connected to the second input of AND gate 33. A circuit 36 is connected between the secondary winding of output transformer 26 and the input of inverter 31 for supplying a signal to the phase detector corresponding in phase to the driving voltage delivered to the load. The primary winding of a transformer 37 is connected across capacitor 12, and secondary winding of this transformer is connected to the inputs of inverter 32 and AND gate 34 by a circuit 38. The input signal supplied by circuit 38 corresponds in phase to the voltage across capacitor 12.

The outputs of AND gates 33, 34 control the actuation of switches 41, 42. Although shown schematically in the drawing, these switches are preferably electronic switches, with the outputs of the AND gates applied to the control inputs of the switches. One terminal of switch 41 is connected to a reference voltage $V_{REF}$, and the other terminal of this switch is connected to one terminal of switch 42. The remaining terminal of switch 42 is grounded, and a resistor 44 is connected between the common terminals of the two switches and the negative input of a differential amplifier 46. As will appear more fully hereinafter, the signal at the negative input of amplifier 46 has an average magnitude corresponding to the relative phases of the load and capacitor voltages.

An adjustable signal having a magnitude generally equal to one-half of the reference voltage $V_{REF}$ is applied to the positive input of amplifier 46 by a voltage divider consisting of a variable resistor 47 and a fixed resistor 48 which are generally equal in value. A capacitor 51 and a resistor 52 are connected in series between the output and the negative input of amplifier 46, and the output of the amplifier is connected to the control input of oscillator 21.

Operation and use of the power supply can be described with reference to FIG. 2. It is assumed that variable resistor 47 is adjusted for operation at the resonant frequency, i.e. so that the voltage applied to the positive input of amplifier 46 is equal to one-half of the reference voltage. Initially, it is also assumed that oscillator 21 is operating at the resonant frequency of load 10 so that the voltage across capacitor 12 leads the driving or source voltage by 90°, as illustrated by waveforms V36 and V38 in FIG. 2 (a). In this situation, the outputs V33 and V34 of AND gates 33 and 34 are each high for exactly one-fourth of each cycle of the output signal. When output V33 is high, switch 41 is closed, and during this quarter cycle voltage V44 and the negative input of amplifier 46 is equal to reference voltage $V_{REF}$. When AND gate output V34 is high, switch 42 is closed, and during this quarter cycle input voltage V44 is zero. During the half cycle when the AND gate outputs are both low, switches 41 and 42 are both open, and input voltage V44 is equal to the reference voltage at the positive input of amplifier 44, i.e., one-half of voltage $V_{REF}$. The control signal VC at the output of amplifier 46 is proportional to the difference between the average level of input voltage V44 and the reference voltage applied to the positive input. At resonance, the average value of input voltage V44 is equal to one-half of reference voltage $V_{REF}$, the control signal is at steady state, and oscillator 21 continues to operate at the resonant frequency.

Figure 2:
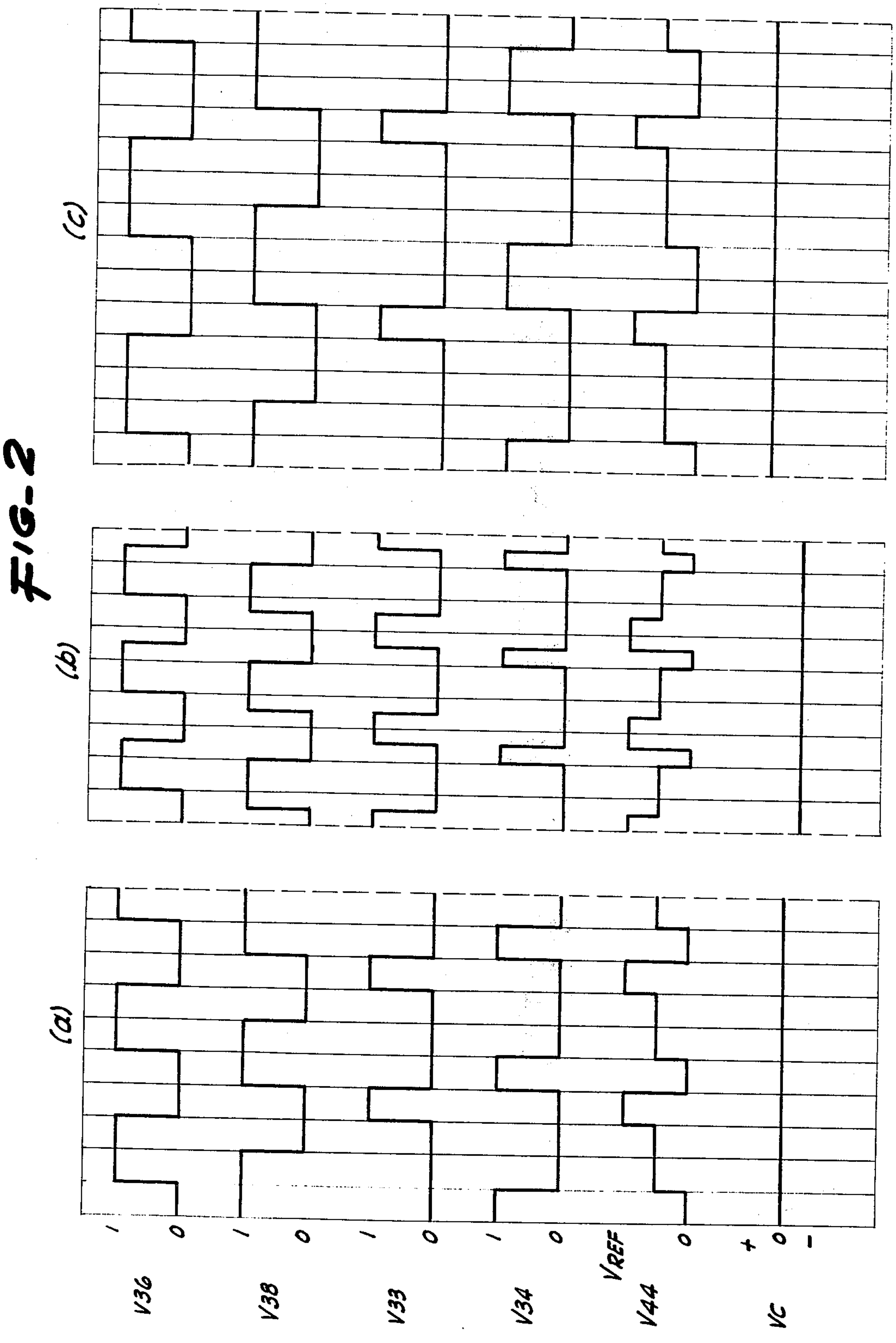
FIG. 2 is a graphical representation of waveforms at various points in the circuit of FIG. 1.

In the event that the oscillator frequency becomes higher than the resonant frequency, as illustrated in FIG. 2 (b), the voltage across capacitor 12 will lead the driving voltage by less than 90°. In this situation, the output of AND gate 33 is high for a greater portion of the cycle than the output of AND gate 34, and the average level of voltage V44 is greater than one-half of reference voltage $V_{REF}$. Consequently, the output of amplifier 46 is a negative voltage which is proportional to the average difference between voltage V44 and one-half of reference voltage $V_{REF}$. This negative control signal decreases the frequency of the oscillator signal to the resonant frequency.

In the event that the oscillator frequency becomes lower than the resonant frequency, as illustrated in FIG. 2 (c), the voltage across capacitor 12 leads the driving voltage by more than90°. In this situation, the output of AND gate 34 is high for a greater portion of the cycle than the output of AND gate 33, and the average level of voltage V44 is less than one-half of reference voltage $V_{REF}$. The control signal VC is a positive voltage which increases the oscillator frequency back to the resonant frequency.

The invention has a number of important features and advantages. The power supply operates at the resonant frequency of the load, and in the event that the resonant load frequency drifts or is driven in either direction, the oscillator is quickly and effectively adjusted to the new resonant frequency. This permits the switching transistors in the power supply to be turned on and off under zero current conditions, minimizing the possibility of damage to them, and greatly increasing the power which the transistors can deliver.

It is apparent from the foregoing that a new and improved power supply has been provided. While only the presently preferred embodiment has been described, as will be apparent to those familiar with the art, certain changes and modifications can be made without departing from the scope of the invention as defined by the following claims.

I claim:

1. In a power supply for delivering power to a resonant load comprising a vapor source work coil for inducing a current in a material to be vaporized and a capacitive element connected electrically in series with the coil:

A. a voltage controlled oscillator for providing an output signal having a frequency determined by a control signal;

B. means responsive to the oscillator signal for delivering power to the load at the frequency of the oscillator signal;

C. a phase detector for monitoring the phases of the voltage delivered to the load and the voltage developed across the capacitive element and providing output signals corresponding to the relative phases of said voltages;

D. means responsive to the phase detector output signals for providing a signal having an average magnitude corresponding to the relative phases of the voltage delivered to the load and the voltage across the capacitive element; and E. means for comparing the average magnitude of the last named signal with a reference signal having a level corresponding to a predetermined difference in the monitored phases and varying the voltage of the control signal applied to the oscillator in accordance with deviations of the average magnitude from the level of the reference signal to maintain the oscillator signal at a predetermined frequency.

2. In a power supply for delivering operating power to a resonant load:

A. a controlled oscillator for providing a radio frequency output signal having a frequency determined by a control signal;

B. a resonant load comprising a vapor source work coil for inducing current in a material to be vaporized and a capacitive element connected electrically in series with the work coil;

C. means responsive to the oscillator signal for delivering radio frequency power to the load at a frequency of the oscillator signal;

D. means for monitoring a phase relationship in the power delivered to the load to detect deviations in the frequency of the power from the resonant frequency of the load; and E. means responsive to the monitored phase relationship for adjusting the control signal to maintain the oscillator signal at a predetermined frequency.

3. The power supply of claim 2 wherein the controlled oscillator is a voltage controlled oscillator.

4. In a power supply for delivering power to a load resonant at a predetermined frequency:

A. a controlled oscillator for providing an output signal having a frequency determined by a control signal;

B. means responsive to the oscillator signal for delivering power to the load at the frequency of the oscillator signal;

C. means for monitoring a phase relationship in the power delivered to the load to detect deviations in the frequency of the power from the resonant frequency of the load, said means for monitoring the phase relationship including 1. a phase detector;
2. means for applying a first input signal to the phase detector corresponding in phase to the voltage across a capacitive element in the load, the phase of the voltage across the capacitive element being in quadrature with the phase of the voltage delivered to the load when the oscillator is operating at the resonant frequency; and D. means responsive to the monitored phase relationship for adjusting the control signal to maintain the oscillator signal at a predetermined frequency.

5. The power supply of claim 1 further including means for adjusting the level of the reference signal and thereby the frequency of the oscillator signal.

6. The power supply of claim 1 wherein the level of the reference signal corresponds to a 90° difference in phase between the load voltage and the voltage across the capacitive element, whereby the frequency of the oscillator signal is maintained at the resonant frequency of the load.

7. The power supply of claim 2 wherein the oscillator signal is maintained at the resonant frequency of the load.

* * * * *